J. A. OHLSSON.
BALL OR ROLLER BEARING.
APPLICATION FILED JUNE 26, 1917.

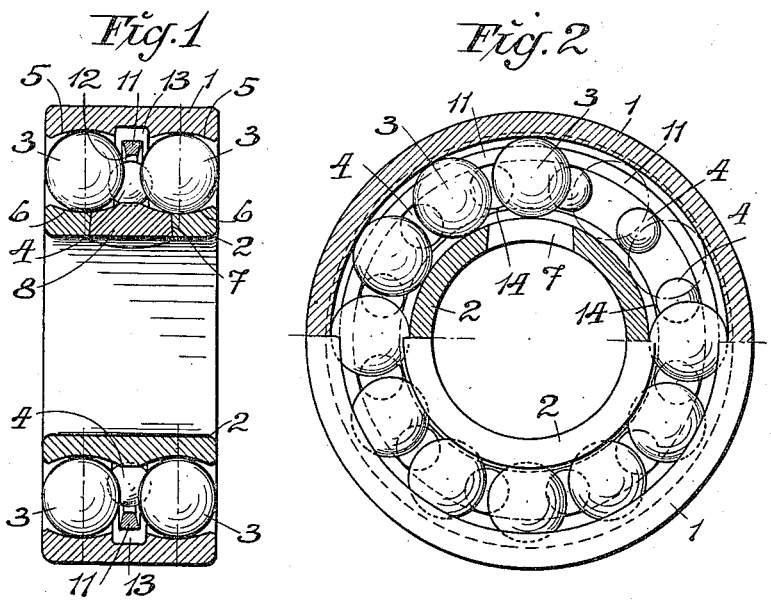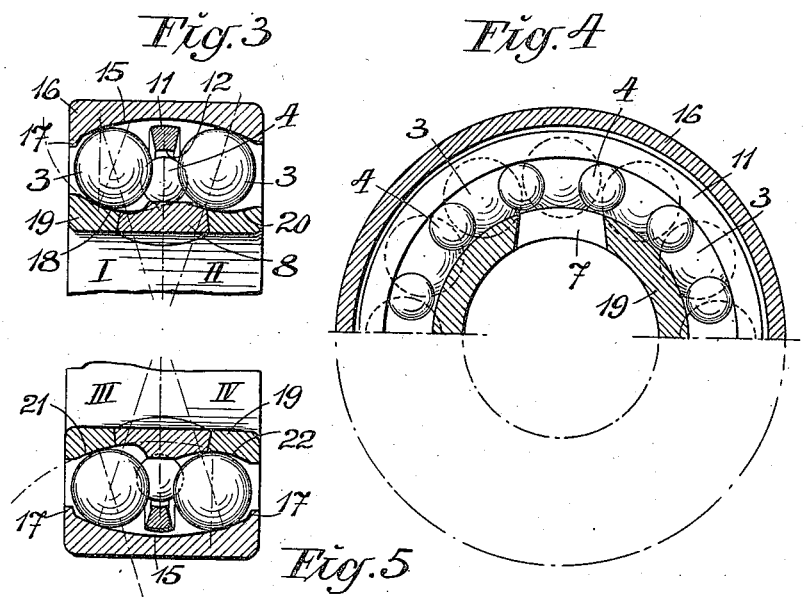

1,375,313.

Patented Apr. 19, 1921.
2 SHEETS—SHEET 2.

Inventor:
Johan Abraham Ohlsson
by attorneys

UNITED STATES PATENT OFFICE.

JOHAN ABRAHAM OHLSSON, OF STOCKHOLM, SWEDEN.

BALL OR ROLLER BEARING.

1,375,313.  Specification of Letters Patent.  Patented Apr. 19, 1921.

Application filed June 26, 1917. Serial No. 177,026.

*To all whom it may concern:*

Be it known that I, JOHAN ABRAHAM OHLSSON, a subject of the King of Sweden, and resident of Kaplansbacken 3, Stockholm, in the Kingdom of Sweden, have invented certain new and useful Improvements in Ball or Roller Bearings, of which the following is a specification, reference being had therein to the accompanying drawings.

This invention relates to improvements in bearings provided with two or more series or rows of balls or rollers. According to the invention balls, rollers or bodies of rotation of any other suitable type (guide bodies) are provided between the series or rows of supporting balls or rollers of the bearing in such manner; that they keep the said supporting balls, etc. in fixed or substantially fixed positions with relation to one another and the running of the balls is as frictionless as possible, the axial or radial thrust being besides sustained and it may be, distributed between the ball series in the most suitable manner.

Figure 6:
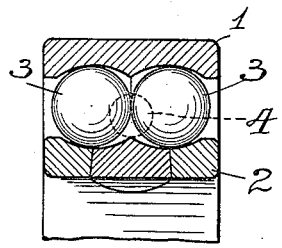
Figure 7:
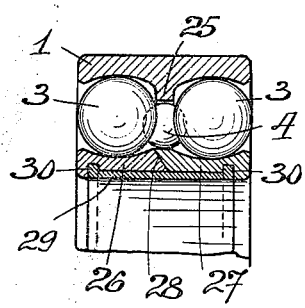
Figure 8:
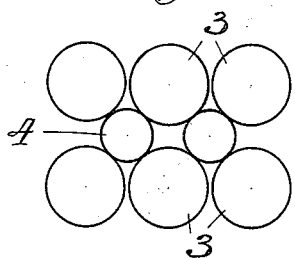
Figure 9:
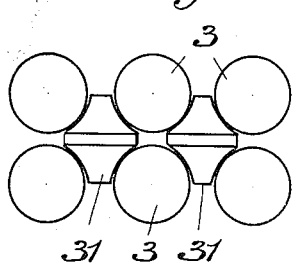
Figure 11:
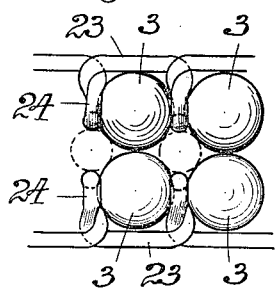
Figure 10:
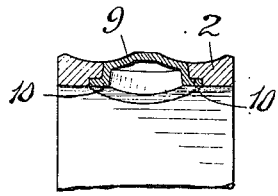

For the illustrating of the invention some forms of the same are shown as examples in the accompanying drawings. Figure 1 is a longitudinal section of a ball-bearing arranged in accordance with the invention and provided with a free guide ring for the guide balls. Fig. 2 is a side view partially a cross-section of the said bearing. Fig. 3 shows in a longitudinal section a part of a ball-bearing with two different types of the inner ball race. Fig. 4 is a side view partially a cross section of the bearing shown in Fig. 3. Fig. 5 is a longitudinal section of a ball-bearing with two other different types of the inner ball race. Fig. 6 shows in a cross section a part of a ball-bearing, in which the supporting balls of each pair bear one against the other. Fig. 7 shows in a longitudinal section a part of a ball-bearing arranged in accordance with this invention, in which the inner ring is made in two pieces and a stationary guide ring is provided for the guide balls. Fig. 8 shows the supporting balls and guide balls disposed in the same plane. Fig. 9 shows diagrammatically a ball bearing, in which guide rollers are substituted for the guide balls between the supporting balls. Fig. 10 shows in a section a plug for closing an opening, through which the balls are put into the bearing. Fig. 11 shows two rows of supporting balls with guide balls and ball retainers.

1, Figs. 1 and 2, is the outer ring of the bearing and 2 is the inner ring. 3, 3 designate the supporting balls of the bearing, located in two rows, and 4, 4 designate smaller balls provided between the said supporting balls. The said balls 4 are termed guide-balls in the following specification. 5, 5 are the ball-races of the outer ring 1 and 6, 6 are the ball-races of the inner ring 2. Each of the said ball-races is curve-shaped in cross-section. 7 is an opening provided in the inner ring 2, preferably at the central plane of the bearing, through which the balls are put into the bearing. The said opening 7 may be closed by a suitably shaped plug 8, after the balls have been introduced. The said plug may be held in its position by the friction with the ring 2 and by the shaft (not shown) mounted in the said ring. An opening for the same purpose may be provided in the outer ring or openings may be provided in both rings simultaneously. In Fig. 10 a plug 9 adapted for the same purpose is shown. The said plug 9 has a flange 10, bearing against the inner side of the inner ring 2. The said plug may be modified in many other ways, for instance it may be made from a piece of a metal strip, suitably bent. 11 is a ring loosely mounted between the two rows of balls 3 and forming a guide or support or abutment to the guide-balls 4. The bearing surface 12 of the said ring for the balls 4 may be straight in cross-section, concave, convex, or angular. The said ring 11 will be moved by the guide-balls in the direction of rotation of the bearing or in opposite direction or be at a standstill, according as the outer ring 1 or the inner ring 2 is stationary and depending on the proportion of the diameters of the supporting balls and the guide-balls. The ring 11 may be made in two or more pieces and, if wanted, a plurality of free rings may be provided at the outer side or the inner side of the row of guide-balls or at both sides of the same. 13 is a groove, which is provided in the inner side of the outer ring 1 and into which the ring 11 may be located, while the parts of the bearing are put together.

As shown in Fig. 2, there is a slight play 14 between the guide-balls 4 and the inner ring 2 of the bearing. By the action of the centrifugal force and the pressure against the balls 3 the guide-balls 4 may during the rotation of the bearing occupy such a position, that they automatically and in a favorable manner distribute the pressure of the shaft between the rows of supporting balls and cause the said balls to bear against their races, even if there is any unevenness in the balls or in the races. Besides, the guide-balls 4 counteract the efforts of the supporting balls to enter the opening 7, adapted for the introducing of the balls into the bearing, or to bear against the plug 8, closing the said opening and preventing the guide-balls from fallng out through the opening, while the bearing is at a standstill. The bearing of the guide-balls against the supporting balls may evidently, be adjusted by changing the shape of the ball-races and their position with relation to one another and the guide-balls must not under all circumstances bear against the supporting balls. Thus, for instance, a certain play may be provided in certain cases without inconvenience. In the form of the invention shown in Figs. 1 and 2 the object of the guide-balls substantially is to separate each pair of supporting balls located side by side from the adjacent pairs of balls and to prevent the supporting balls from falling down into the opening 7. Preferably, the contact points of each guide-ball with the four adjacent supporting balls (or the center point of each guide-ball) are located substantially in the plane of the center points of the said supporting balls. The guide-balls may, evidently, be of any size within certain limits, but for the adapting of the dimensions of the bearing the diameter of the guide-balls is preferably shorter than that of the supporting balls with the limitation determined by the solidity of the bearing. The center point of each guide-ball may, if wanted, be located outside or inside the plane, passing through the center points of the adjacent supporting balls, in order that the guide-balls may be prevented from falling inward or outward respectively, in the bearing. The position of the guide-balls may in each case be determined by the ring 11.

In Figs. 3 and 5 different forms of the ball-races are shown, designated by I, II, III and IV. In both the said figures the ball-race 15 of the outer ring 16 is spherical, concave in cross-section, in order that adjustment of the bearing to some extent may be possible. For the same purpose the ball-race of the inner ring may be spherical, convex in cross-section. Besides the outer ring 16 has an inner flange 17 at one side or at both sides in order to prevent the inner ring or the outer ring from being swung laterally for such a distance, that the balls can leave the bearing. According to form I the ball-race 18 of the inner ring 19 is so shaped, that the contact points of the supporting balls 3 with the outer and inner rings 16, 19 are located in the same plane perpendicular to the axis of the bearing. The part of the inner ring forming the ball-race proper is circular in cross-section, the radius of the circle being shorter than the radius of the spherical ball-race of the outer ring. According to the form II of Fig. 3 the ball-race 20 of the inner ring 19 is circular in cross-section, the center point of the circle being located on the line, which connects the center point of the bearing with the center point of the supporting ball and, it may be, the contact point of the ball with the ball-race of the outer ring. According to form III of Fig. 5 the ball-race 21 of the inner ring has substantially the same shape as in the form I but the part forming the ball-race proper is circular in cross-section, the radius of the circle having the same length as the radius of the spherical ball-race of the outer ring. According to form IV of Fig. 5 the ball-race 22 of the inner ring 19 has the same shape as the ball-races of the inner ring 2 of Fig. 1, while the ball-race of the outer ring is spherical, as stated above. Many other forms of the races may, evidently, be used.

The bearing may, evidently, be provided with a ball retainer, Fig. 11, for one of the rows of supporting balls or for both rows of supporting balls, each retainer 23 consisting of one or more wires formed into loops 24, separating the supporting balls 3. Such a retainer may be provided also for the guide-balls.

In the form of the invention shown in Fig. 6 the supporting balls 3 bear against one another. The said balls are separated by guide-balls 4.

In the bearing shown in Fig. 7 the loosely mounted ring 11, Figs. 1 and 2, is omitted and for the same a ring-shaped flange 25 provided on the outer ring 1 and extending inward is substituted, which flange forms a support or guide to the guide-balls 4. In the said bearing the inner ring is made in two parts 26, 27, completing one another. Preferably, the contact surfaces 28 of the said parts are oblique, as shown. The said parts 26, 27, may be connected by any suitable means, for instance by a ring 29, provided at its ends with flanges 30, engaging grooves in the parts 26, 27. The outer ring may, evidently, be arranged in a similar manner.

Instead of the guide-balls stated above any other suitable bodies of rotation may be used, for instance roller 31, Fig. 9, the end portions of which are so turned, that suitable bearing surfaces for the supporting balls 3 are provided.

In the form of the invention shown in Fig. 6 and also in other forms of the same other means than guide-balls or guide-rollers may be used for keeping the supporting balls by pairs at fixed positions and preventing the balls of the rows from passing one another, for instance metal strips bent into the shape of rhombs or disks provided with spherical recesses for the balls. The said arrangements, however, are not so practical as the guide-balls, etc., owing to the fact that sliding friction results from the same.

Instead of spherical supporting balls other supporting bodies may be used, which approach to or fully pass into the shape of rollers.

The loosely mounted supporting or guide ring (or rings) 11 may be guided in any suitable manner, for instance by means of balls or rollers. The present invention may, evidently, be applied also to bearings provided with more than two rows of balls.

Having now described my invention, what I claim as new and desire to secure by Letters Patent is:

1. In a bearing, the combination of a plurality of rows of supporting bodies of rotation, a solid outer ring, a solid inner ring, separated grooves provided for the said rows in one of the said rings, guide-bodies of rotation located between the rows of supporting bodies and separating the bodies of each row from one another, and a guide member for the said guide bodies, said guide member being interposed loosely between the solid outer and inner rings and between the rows of supporting bodies.

2. In a bearing, the combination of a plurality of rows of supporting bodies of rotation, a solid outer ring, a solid inner ring, separated grooves provided for the said rows in one of the said rings, the said grooves being so shaped that the supporting bodies bear against the outer and inner rings at points located substantially in the same plane, perpendicular to the axis of the bearing, guide bodies of rotation located between the rows of supporting bodies and separating the bodies of each row from one another, and a guide member for the said guide bodies of rotation, said guide member being interposed loosely between the solid outer and inner rings and between the rows of supporting bodies.

3. In a bearing, the combination of a plurality of rows of supporting bodies of rotation, a solid outer ring, a solid inner ring, separated grooves provided for the said rows in one of the said rings, guide bodies of rotation located between the rows of supporting bodies and separating the bodies of each row from one another, a radially disposed opening in one of said solid rings for the insertion and removal of the supporting and guide bodies, and a guide member for the guide bodies, said member being interposed loosely between the solid outer and inner rings and between the rows of supporting bodies.

4. In a bearing, the combination of a plurality of rows of supporting bodies of rotation, a solid outer ring, a solid inner ring, separated grooves provided for the said rows in one of the said rings, guide bodies of rotation located between the rows of supporting bodies and separating the bodies of each row from one another, a radially disposed opening in one of said solid rings for the insertion and removal of the supporting and guide bodies, a plug for closing said opening, and a guide member for the guide bodies, said member being interposed loosely between the solid outer and inner rings and between the rows of supporting bodies.

In witness whereof, I have hereunto signed my name.

JOHAN ABRAHAM OHLSSON.